United States Patent [19]

Nye

[11] Patent Number: 5,047,179
[45] Date of Patent: Sep. 10, 1991

[54] DISTILLATION TRAY

[75] Inventor: James O. Nye, Friendswood, Tex.

[73] Assignee: Nye Trays, Inc., Friendswood, Tex.

[21] Appl. No.: 660,521

[22] Filed: Feb. 25, 1991

Related U.S. Application Data

[62] Division of Ser. No. 233,769, Aug. 19, 1988, abandoned.

[51] Int. Cl.[5] .............................................. B01F 3/04
[52] U.S. Cl. .................................................. 261/114.1
[58] Field of Search ...................................... 261/114.1

[56] References Cited

U.S. PATENT DOCUMENTS

| 2,420,075 | 5/1947  | Glitsch ............................ 261/114.2 |
| 2,491,762 | 12/1949 | Glitsch ............................ 261/114.2 |
| 2,565,355 | 8/1951  | Cook ............................... 261/114.1 |
| 2,582,657 | 1/1952  | Semer .............................. 261/114.1 |
| 2,582,826 | 1/1952  | Glitsch ............................ 261/114.2 |
| 2,591,343 | 4/1952  | Eld ................................. 261/114.1 |
| 2,596,249 | 5/1952  | Kerrigan ........................... 261/114.2 |
| 2,646,977 | 7/1953  | Kraft .............................. 261/114.1 |
| 2,690,332 | 9/1954  | Jorgensen .......................... 261/114.2 |
| 2,692,128 | 10/1954 | Bowles ............................. 261/114.1 |
| 2,693,949 | 11/1954 | Huggins ............................ 261/114.1 |
| 2,699,929 | 1/1955  | Bowles ............................. 261/114.1 |
| 2,714,504 | 8/1955  | Bowles ............................. 261/114.1 |
| 3,282,576 | 11/1966 | Bruckert et al. .................... 261/114.1 |
| 3,540,781 | 2/1951  | Glitsch ............................ 261/114.2 |
| 3,573,172 | 3/1971  | Strenber ........................... 261/114.2 |
| 3,633,883 | 1/1972  | McGlothlin ......................... 261/114.1 |
| 3,700,216 | 10/1972 | Uitti et al. ....................... 261/114.1 |
| 4,174,363 | 11/1979 | Bruckert ........................... 261/114.1 |
| 4,275,021 | 6/1981  | Kirkpatrick et al. ................. 261/114.1 |
| 4,278,621 | 7/1981  | Sigmund et al. ..................... 261/114.1 |
| 4,301,098 | 11/1981 | Mix ................................ 261/114.1 |
| 4,442,048 | 4/1984  | Abernathy et al. ................... 261/114.1 |
| 4,504,426 | 3/1985  | Chuang et al. ...................... 261/114.1 |
| 4,510,023 | 4/1985  | Bennett et al. ..................... 261/114.2 |

FOREIGN PATENT DOCUMENTS 1057048 11/1983 U.S.S.R. ............................ 261/114.1
 129765 of 1919 United Kingdom .................... 261/114.1

Primary Examiner—Tim Miles
Attorney, Agent, or Firm—Kenneth H. Johnson

[57] ABSTRACT

An improved distillation column downcomer, in which the seal pan of the downcomer is spaced above the adjacent lower tray and connected to the tray by a perforated plate, whereby the effective active tray area is increased (by placing that portion of the tray normally occupied by the downcomer seal pan back into use as a portion of the tray through which vapor may pass for contact with the liquid on the tray—the contact being made by the vapor passing through the perforated plate connecting the seal pan and the tray), which thereby increases the throughput capacity of a given distillation tower.

15 Claims, 3 Drawing Sheets

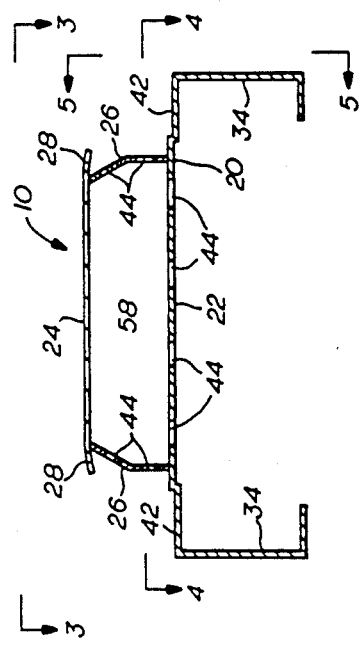
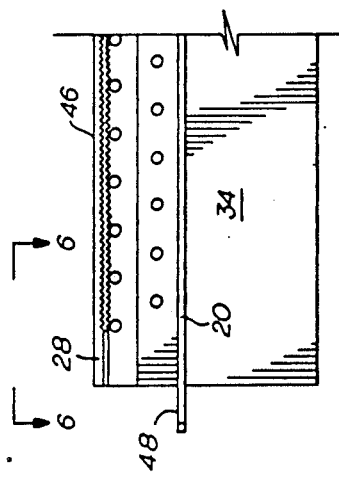
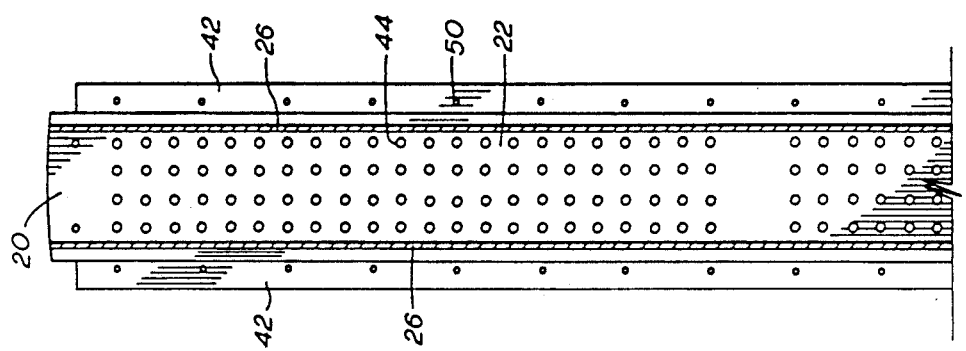
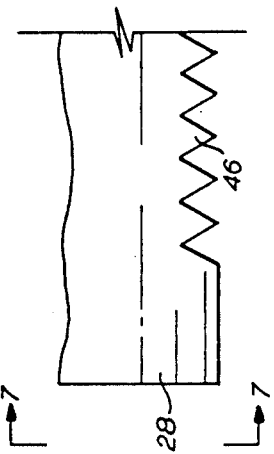
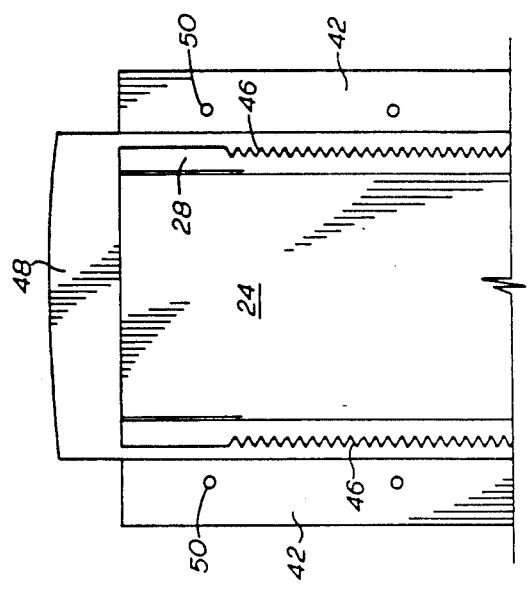
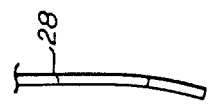

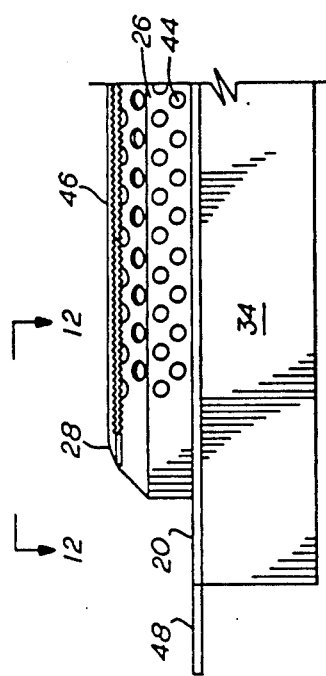
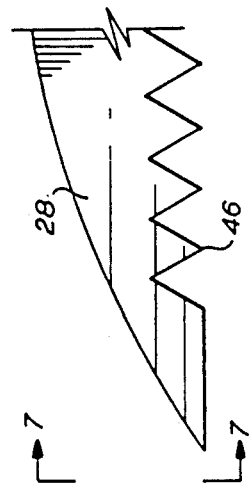
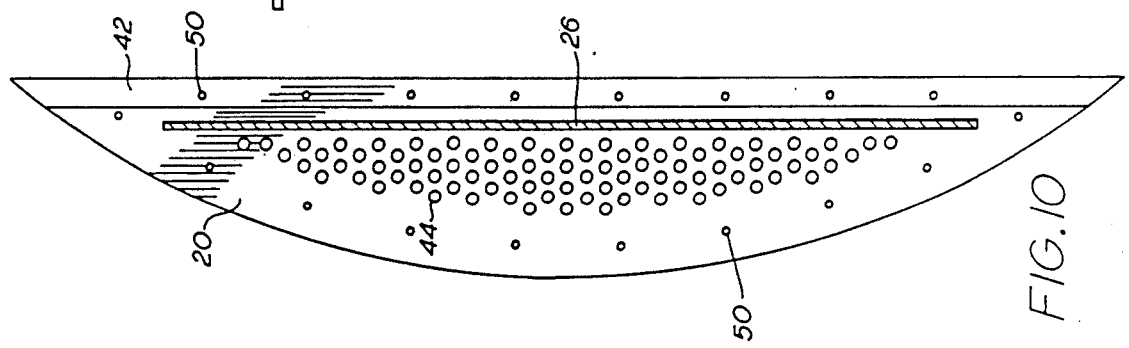
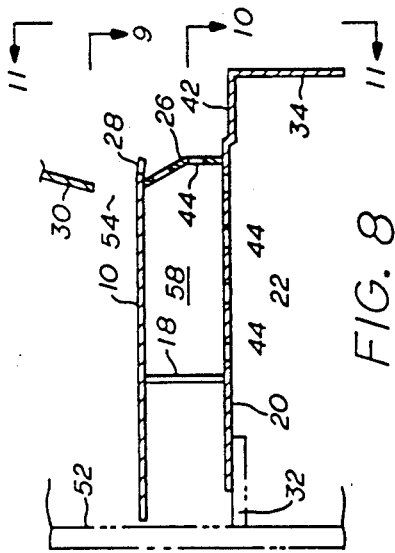
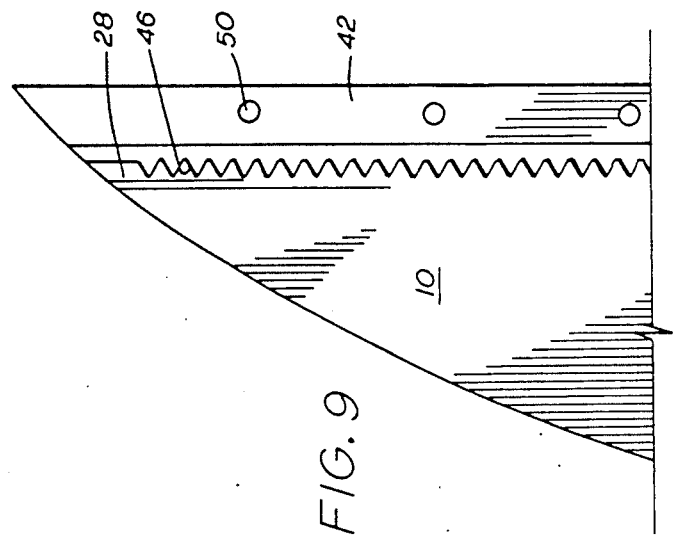

DISTILLATION TRAY

This is a division of application Ser. No. 07/233,769, filed Aug. 19, 1988, now abandoned.

BACKGROUND OF THE INVENTION

1. Field of The Invention

The present invention relates to an improved distillation column, particularly an improved tray. More specifically it relates to a new downcomer assembly.

2. Related Art

In the ordinary operation of a tray on distillation column the liquids flow downwardly while the gases flow upwardly. In a distillation column there are usually a plurality of plates or trays. The trays have some means of allowing vapor to flow upwardly, e.g., plurality of openings while flowing the liquid on to the tray, thereby bringing the downflowing liquid in contact with the upflowing vapors on the tray. When the liquid contacts the vapor on each tray, and mass transfer occurs, the lighter constituent(s) is concentrated in the overheads of the tower, and the heavier constituent(s) is concentrated in the lower part of the tower. The liquid moves downward from tray to tray, generally by means of downcomers.

Early downcomers are illustrated by U.S. Pat. Nos. 2,565,355; 2,582,657; 2,582,826; 2,699,929; 2,714,504 and 3,573,172, wherein each downcomer is of substantially uniform cross section. There is entrained vapor in the liquid entering the downcomers, and therefore a disengagement of vapor from the liquid in the downcomer is going to occur with a specific area of the downcomer being required to achieve this, to prevent a prematurely "flooded tower" arising. Likewise, there are entrained droplets of liquid in the vapor rising from the tray. If the upward velocity of the vapor is sufficiently low, these droplets will fall back to join the liquid on the tray from whence they came. As the upward vapor velocity increases, more and more droplets are entrained to the tray above. This liquid must then flow back through the downcomer. When the vapor velocity reaches the point that more liquid is entrained upward than the downcomer can handle, flooding occurs. Thus, in the design of a tower there is a competing factor to consider, which is the active area of the tray. The active area is mathematically defined as the cross-sectional area through which the upward flowing vapor passes. The upward velocity of the vapor is the volume of vapor divided by the "effective active area" of the tower.

The vapor handling capacity of the tower is generally proportional to the active area of the tray(s). It was found that in the downcomers that the disengagement of the vapors and liquid may be accomplished by enlarging the area of the upper portion of the downcomer and reducing the area of the lower portion of the downcomer. This in effect increased the area of the tray(s), and is illustrated for example in U.S. Pat. Nos. 2,420,075; 2,491,726; 2,591,343; 2,596,249; and 4,174,363. Hence, the improvement pursued has been to maintain the required area in the downcomer for vapor disengagement while increasing the effective active area of the tray(s).

Some unique approaches to this desirable result have been devised by the art, for example, terminating the downcomer above the liquid level of the tray below of a type like that shown in U.S. Pat. No. 4,278,621, an alternative system has been the use of a downcomer seal pan above the tray but below the liquid level and perforated bubble caps or bubble promoters of a type as shown in U.S. Pat. No. 4,510,023.

The present invention increases the effective active tray area in the column. This is achieved without loss of any of the useful downcomer volume. Actual testing showed that the improved throughput of the column was directly proportional to the increase in effective active area. It is a feature of the present invention, that by initiating vigorous contacting of the vapor and liquid as the liquid enters the tray, the general frothing action on the whole tray increases, thereby increasing the mass transfer and tray stability. It is an advantage of the present invention that the capacity (i.e., throughput of a multi-tray distillation columns) is substantially increased, i.e., the same column (same size, number of trays, feed purity, etc). It is a further advantage that the improved structure may be a retro fit, replacing substantially only part of the downcomers. These and other advantages and features will become apparent from the following.

SUMMARY OF THE INVENTION

Briefly the present invention is an improvement in the downcomer portion of a distillation column wherein the bottom, i.e., seal pan of the downcomer is positioned above the adjacent lower tray and a first perforated plate extended down from, and preferably away from, the bottom of the downcomer to the lower adjacent tray. A second perforated plate is generally used to replace the former seal pan. This simple expedient has shown up to a 20% increase in throughput over the same column using prior art type of downcomers. Basically the upward moving vapors can pass through the second perforated plate, if any, and then through the first perforated plate in the same manner as they do through the tray, hence in effect the first perforated plate which extends between the tray and the seal pan serves or at least functions as additional tray surface. Similarly, the second perforated plate, which may be positioned where the seal pan was formerly positioned, may also be considered to represent an addition to the tray surface. It is preferred that the first perforated plate is inclined at least in part, that is, it extends away from the bottom of the downcomer. This gives a slightly greater surface and also facilitates the vapor passage and contact with the liquid.

In the one embodiment the bottom of the downcomer extends over the perforated plate to form a lip which is more preferably serrated. The serrated configuration may contribute to better contact between the rising vapors from the perforated plate and the liquid coming from the downcomer.

BRIEF DESCRIPTION OF THE DRAWINGS

FIG. 2 is a cross sectional view of center mount downcomer bottom assembly

FIG. 3 is a partial in plan view of the assembly of FIG. 2 taken along line 3—3.

FIG. 4 is a partial in plan view of the assembly of FIG. 3 taken along line 4—4.

FIG. 5 is a partial front elevation view of the assembly of FIG. 2 taken along line 5—5.

FIG. 6 is a partial detail view of the serrated lip of the assembly of FIG. 5 taken along line 6—6.

FIG. 7 is a side view of the serrated lip of FIG. 6 taken along line 7—7.

FIG. 8 is a cross sectional view of a side mount downcomer bottom assembly.

FIG. 9 is a partial in plan view of the assembly of FIG. 8 taken along line 9—9.

FIG. 10 is a partial in plan view of the assembly of FIG. 8 taken along line 10—10.

FIG. 11 is a partial front elevational view of the assembly of FIG. 8 taken along line 11—11.

FIG. 12 is a partial detail of the serrated lip of FIG. 11 taken along line 12—12.

DETAILED DESCRIPTION AND PREFERRED EMBODIMENTS

Figure 1:
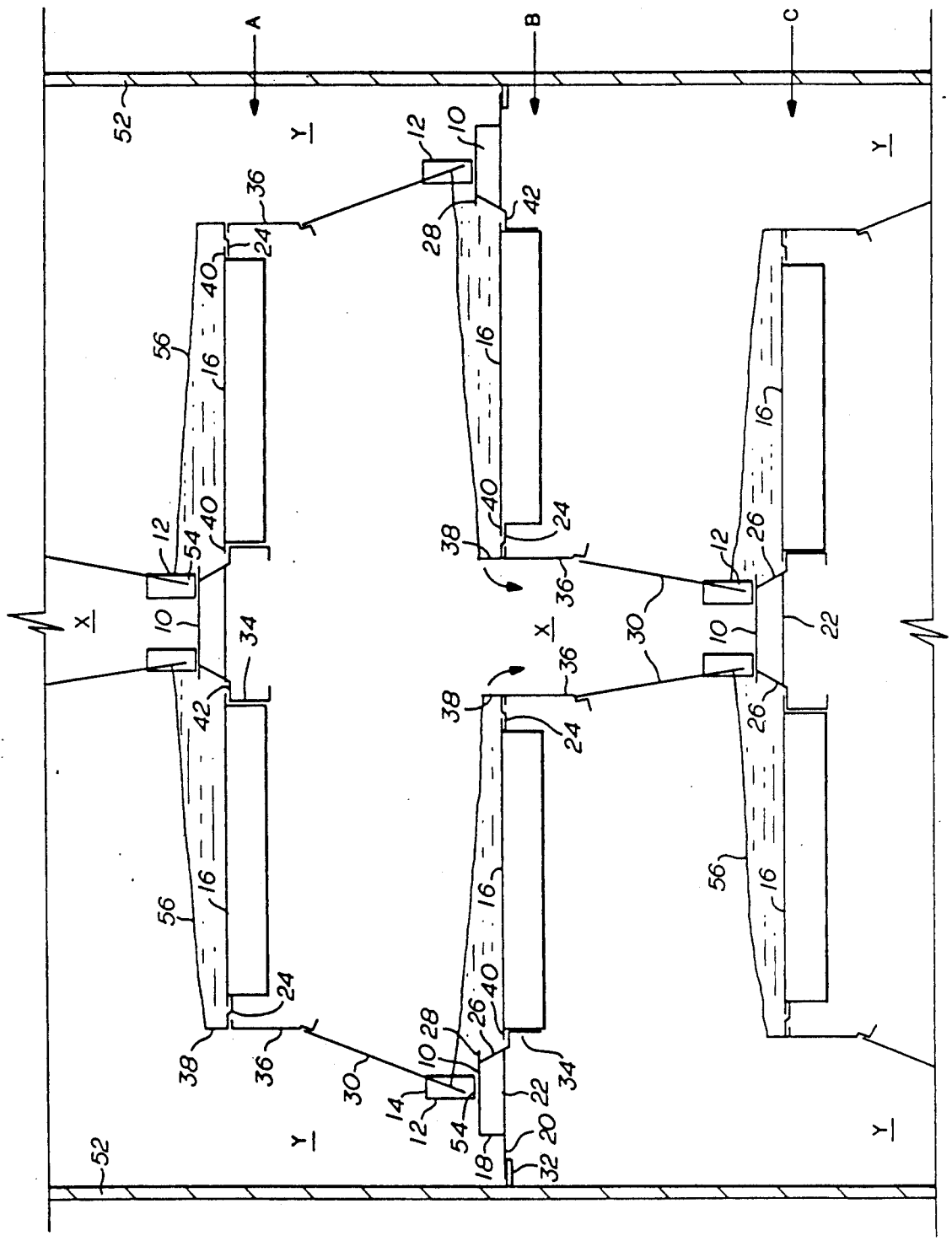
FIG. 1 is a schematic representation of a cross sectional view of a section of a distillation column employing both side mounted and central mounted downcomers according to the present invention.

In the drawings the same or substantially same elements have been given the same indicia.

In FIG. 1 the schematic represents a partial of a distillation column with wall 52 and three trays levels A, B and C. In this embodiment there are both centrally positioned downcomers X and laterally positioned downcomers Y, thus illustrating two modes employing the present invention. On level A a central downcomer is shown with seal pan 10 having support members 12 bolted to the top surface thereof. Each support member 12 has a slot 14 extending into it. The angle of the slot is determined by the slope or incline of the downcomer wall seated in the slot. There will usually be at least two such support members 12 position along the seal pan and associated with a particular downcomer wall 30 to support and position th downcomer wall. Each downcomer wall 30 is formed of a plate, i.e., preferably an inclined plate.

The area at the bottom of the downcomer is generally 50 to 70% of the area at the top of the downcomer. The downcomer percent of flood should be 60 to 90% of the jet flood, preferably 83 to 86 %.

Depending directly from seal pan 10 and sealed thereto are the perforated plate(s) 26, which extends downward and along the seal pan. Preferably the perforated plate(s) 26 are inclined or at least have a portion thereof which is inclined. A portion of the seal pan extends over the perforated plate to form lip 28. As shown in FIGS. 3 and 9 a substantial portion of the lip is serrated. The serrations help distribute the upflowing vapors through the liquid exiting the downcomer via gap 54. The liquid level 56 is illustrated on the left hand trays 16 of FIG. 1.

There is frothing of the liquid on the tray such that the froth level may be higher in the area of the downcomer than at the weir 38.

FIG. 8 shows a tray assembly used in a lateral (side) downcomer in greater detail. The bottom member 20 has perforation over a portion 22 and has been formed to provide a shoulder 42 and a side member 34. The shoulder 42 is adapted to have a flange 40 of tray 16 seat thereon with the side member 34 providing a seating surface against which the tray can be snugged up. On the B level support flanges 24 are extended from plates 36 to provide a site to seat the flange 40 of the tray 16 at the upper end of the central downcomer X. There are holes 50 provided along the flange 42 to correspond to holes in the flange 40 (not shown) for screw or bolt mounting. Openings 44 are provided in bottom plate 20 to form the perforated portion 22. The vertical member 18 is sealed to member 20 and to seal pan 10 to isolate the openings on portion 22, member 18, seal pan 10 and the perforated plate 26 in to a chamber 58. The vapor passes up through openings 44 in portion 22 into the chamber 58 then exit through the openings 44 in perforated plate 26. The amount of vapor passing through the insert should be approximately proportional to the bottom area of the downcomer relative to the effective active area. The seal pan seats against wall 52 and forms tight seal when the bottom member is drawn down on the flange 32 by conventional means such as metal screws through corresponding openings 50 in the flange and member 20. The liquid in the downcomer passes through gap 54 between wall 30 and seal pan 10 over lip 28 on to tray 16. The gap 54 is determined by the flow rates in the column, in the same manner as for conventional arrangements. Since the downcomers will generally be sloped, the actual downcomer bottom width will increase as the clearance increases.

In the downcomers shown in FIG. 1 the upper portion 36 is a substantially vertical member adapted to cooperate with the wall 30. Obviously these two portions could be fabricated as one piece, but assembly in the column is easier with the two separate pieces.

FIG. 3 shows a lateral extension 48 of the bottom member 20, which forms an additional flange for seating and support at the end of the trough like structure formed in this embodiment.

FIG. 2 shows a central downcomer tray assembly which has two liquid/vapor contact sides, that is, there are two perforated plates sealed between seal pan 10 and the perforated portion 22 of bottom member 20. Similarily there are provided two shoulders 42, side members 34, and lips 28.

There are many variations and permutations relating to conventional aspects of distillation columns which can be employed with the present invention, as well as variations on the elements of the present invention, for example: circular, square, or rectangular central downcomers, combinations of circular and trough like central downcomers, multiple weirs of even or uneven height, non serrated lips, elimination of the lip(s), elimination of the bottom member and using braces for strength.

The invention claimed is:

1. A downcomer for use in a distillation column comprising:

A generally downward extending inclined plate, which describes at least one surface enclosing a space having a downwardly decreasing volume, said inclined plate being positioned along a seal pan and spaced slightly thereabove, said seal pan being secured to a tray within said distillation column and positioned entirely above said tray, and a perforated plate positioned adjacent to and extending downward from and along said seal pan.

2. The downcomer according to claim 1 wherein said seal pan forms a lip over said perforated plate.

3. The downcomer according to claim 2 wherein said lip is serrated.

4. The downcomer according to claim 1 wherein said perforated plate at least partially is inclined away from said seal pan.

5. The combination of a cylindrical column having a plurality of spaced trays extending transversely across the interior thereof, a vertical downcomer for each tray including a plate depending from each tray and having its lower end terminating above a seal pan positioned entirely above the next lower of each of said plurality of said trays and a perforated inclined plate positioned entirely below said seal pan, depending from said seal pin and terminating at said next lower of said plurality of said trays.

6. The combination according to claim 5 wherein said perforated inclined plate extends away from said seal pan.

7. The combination according to claim 6 wherein said plate depending from each tray in inclined and describes a space of decreasing volume as the downcomer.

8. The combination according to claim 6 wherein said seal pan forms a lip over said perforated inclined plate.

9. The combination according to claim 8 wherein said lip is serrated.

10. The combination according to claim 5 wherein each tray has a weir associated with each downcomer.

11. In a distillation column having trays and downcomers wherein the improvement comprises:
a seal pan positioned below each of said downcomers, each of said downcomers terminating above said seal pan, and a perforated plate positioned entirely below each said seal pan, each said seal pan being positioned entirely above a tray and spaced away therefrom by said perforated plate.

12. The distillation column according to claim 11 wherein said perforated plate is inclined and extends away from said seal pan.

13. The distillation colum according to claim 12 wherein said seal pan forms a lip over said perforated plate.

14. The distillation column according to claim 13 wherein said lip is serrated.

15. The combination of a cylindrical column having a plurality of spaced trays extending transversely across the interior thereof and a downcomer assembly positioned above one or more of said trays comprising:
(a) seal pan,
(b) a generally downwardly extending perforated plate sealed to said seal pan and
(c) a generally downwardly extending member sealed to said seal pan, and
(d) a base plate extending across and beyond said plate and said member, said base plate being perforated in the area between said plate and said member.

* * * * *